United States Patent
Chida

(10) Patent No.: US 7,916,351 B2
(45) Date of Patent: Mar. 29, 2011

(54) IMAGE PROCESSING APPARATUS AND METHOD, PRINTER DEVICE, AND COMPUTER READABLE RECORDING MEDIUM

(75) Inventor: Yoshihiro Chida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 713 days.

(21) Appl. No.: 11/934,356

(22) Filed: Nov. 2, 2007

(65) Prior Publication Data

US 2008/0239399 A1    Oct. 2, 2008

(30) Foreign Application Priority Data

Mar. 29, 2007    (JP) ................................. 2007-089139

(51) Int. Cl.
*H04N 1/405* (2006.01)
(52) U.S. Cl. ...................................... 358/3.15; 358/3.16
(58) Field of Classification Search ................... 358/1.2, 358/1.8–1.9, 2.1, 2.99, 3.06–3.08, 3.14–3.15, 358/3.2, 1.16
See application file for complete search history.

(56) References Cited

U.S. PATENT DOCUMENTS 6,438,274 B1 * 8/2002 Tokuyama et al. ........... 382/298
6,999,619 B2 * 2/2006 Toda ............................ 382/172

FOREIGN PATENT DOCUMENTS

JP         11066293 A   *  3/1999
JP      A 2000-255120       9/2000

* cited by examiner

*Primary Examiner* — Thomas D Lee
*Assistant Examiner* — Stephen M Brinich
(74) *Attorney, Agent, or Firm* — Oliff & Berridge, PLC

(57) ABSTRACT

An image information acquisition unit obtains first print image information that is binarized with the use of a first threshold matrix. A threshold matrix information acquisition unit obtains information representing the first threshold matrix. A determining unit divides the first print image information obtained by the image information acquisition unit into a plurality of portions, and determines whether each of the divided portions includes contour information, based on the first threshold matrix obtained by the threshold matrix information acquisition unit. A generating unit generates second print image information by performing a re-binarizing operation for each of the divided portions of the first print image information with the use of a second threshold matrix that is different from the first threshold matrix, based on the determination result of the determining unit.

13 Claims, 16 Drawing Sheets

FIG. 7A
| 50 | 50 | 50 | 50 | 50 |
|----|----|----|----|----|
| 50 | 50 | 50 | 50 | 50 |
| 50 | 50 | 50 | 50 | 50 |
| 50 | 50 | 50 | 50 | 50 |
| 50 | 50 | 50 | 50 | 50 |
III →
FIG. 7B
| 50 | 0  | 0  | 0  | 0  |
|----|----|----|----|----|
| 50 | 50 | 0  | 0  | 0  |
| 50 | 50 | 50 | 0  | 0  |
| 50 | 50 | 50 | 50 | 0  |
| 50 | 50 | 50 | 50 | 50 |
IV →
FIG. 7C
THRESHOLD MATRIX A →
| 66 | 70 | 74 | 78 | 82 |
|----|----|----|----|----|
| 62 | 18 | 22 | 26 | 86 |
| 58 | 14 | 2  | 30 | 90 |
| 54 | 10 | 6  | 34 | 94 |
| 50 | 46 | 42 | 38 | 98 |
FIG. 7D
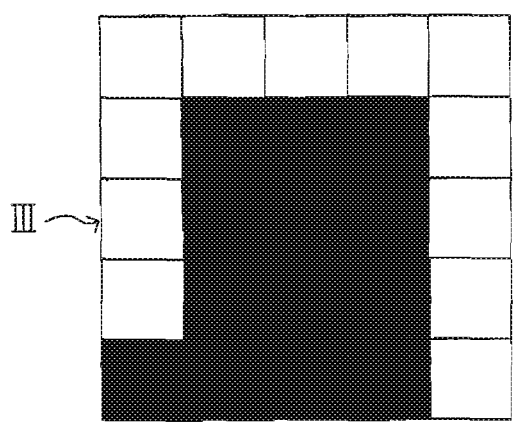
III →
FIG. 7E
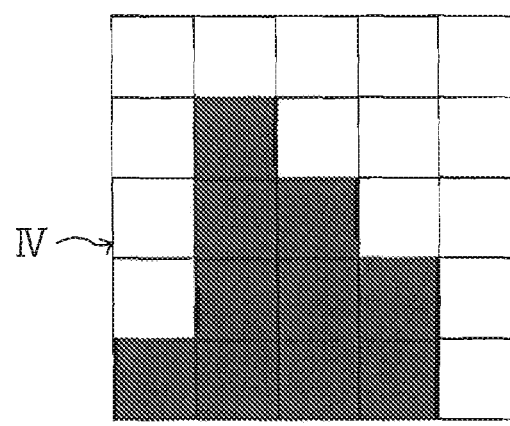
IV →

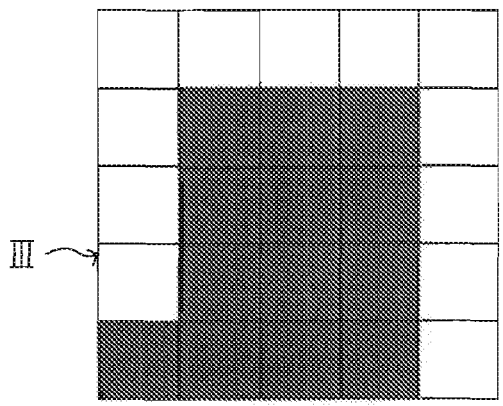
FIG. 9A
52% IS BLACK
CONCENTRATION OF THIS CELL IS 52%
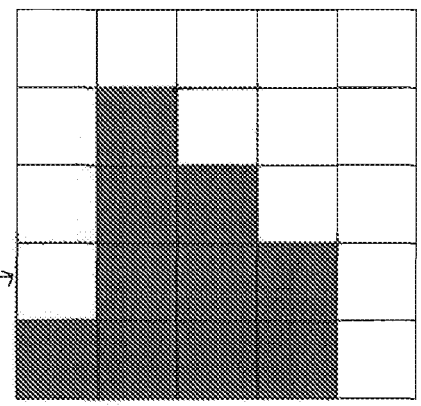
FIG. 9B
40% IS BLACK
CONCENTRATION OF THIS CELL IS 40%
FIG. 9C
THRESHOLD MATRIX B
| 86 | 70 | 46 | 14 | 6  |
|----|----|----|----|----|
| 78 | 94 | 62 | 30 | 22 |
| 34 | 50 | 98 | 54 | 38 |
| 18 | 26 | 58 | 90 | 74 |
| 2  | 10 | 42 | 66 | 82 |
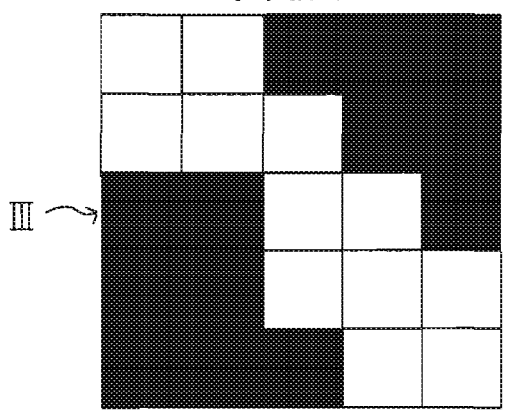
FIG. 9D
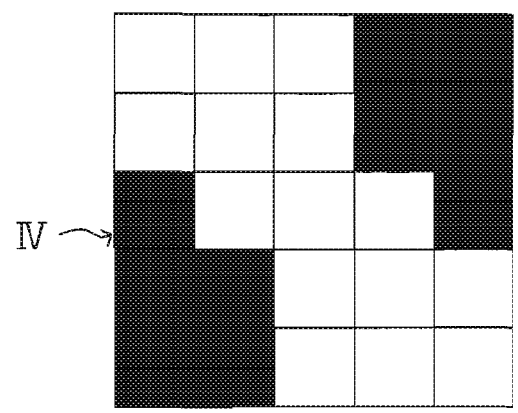
FIG. 9E

CONVERTED DATA C

FIG. 11A
| | 66 | 70 | 74 | 78 | 82 |
|---|---|---|---|---|---|
| | 62 | 18 | 22 | 26 | 86 |
| | 58 | 14 | 2 | 30 | 90 |
| ThWmin | 54 | 10 | 6 | 34 | 94 |
| ThBmax | 50 | 46 | 42 | 38 | 98 |
FIG. 11B
| | 66 | 70 | 74 | 78 | 82 |
|---|---|---|---|---|---|
| | 62 | 18 | 22 ThWmin | 26 | 86 |
| | 58 | 14 | 2 | 30 | 90 |
| | 54 | 10 | 6 | 34 | 94 |
| ThBmax | 50 | 46 | 42 | 38 | 98 |
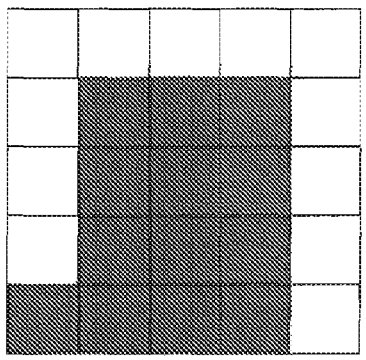
FIG. 11C
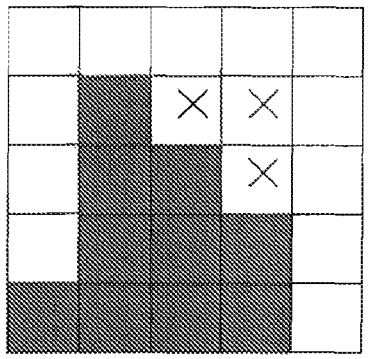
FIG. 11D
FIG. 11E   THRESHOLD MATRIX B
| 86 | 70 | 46 | 14 | 6 |
|---|---|---|---|---|
| 78 | 94 | 62 | 30 | 22 |
| 34 | 50 | 98 | 54 | 38 |
| 18 | 26 | 58 | 90 | 74 |
| 2 | 10 | 42 | 66 | 82 |
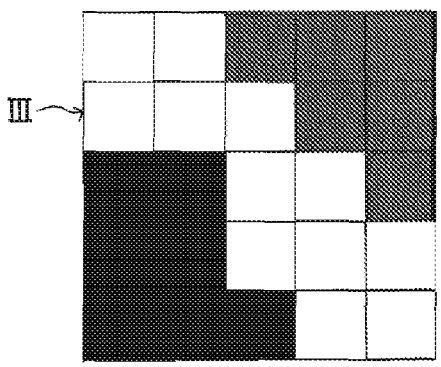
FIG. 11F
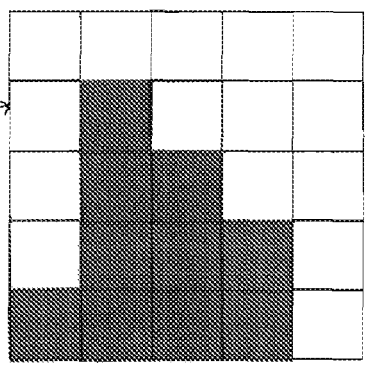
FIG. 11G

IMAGE PROCESSING APPARATUS AND METHOD, PRINTER DEVICE, AND COMPUTER READABLE RECORDING MEDIUM

CROSS-REFERENCE TO RELATED APPLICATIONS

This application is based on and claims priority under 35 USC 119 from Japanese Patent Application No. 2007-89139 filed on Mar. 29, 2007.

BACKGROUND

1. Technical Field

The present invention relates to an image processing apparatus and method, a printer device, and a computer readable recording medium.

2. Related Art

When multi-value raster data that is input via a computer or a scanner is printed out by a printer device, a binarizing operation using a threshold matrix such as a dither matrix that is set in accordance with the characteristics of the image processing apparatus is performed for the input multi-value raster data. Based on the binarized raster data, a printing operation is performed by the printer device.

The number, the size, and the shape of dots that can be formed vary among printer devices. Therefore, an image processing apparatus needs to perform a binarizing operation suitable for the characteristics of respective image processing apparatus devices.

When a printing operation using raster data binarized in accordance with the characteristics of a certain printer device is performed by another printer device, the image quality is degraded, as interference fringes are formed in the output image or the gradient is impaired.

To counter this problem, it is known that when a printing operation using raster data binarized in accordance with the characteristics of a certain printer device is performed by a different printer device, the binarized raster data is converted into multi-value image data, and a binarizing operation according to the characteristics of the different printer device is performed. However, a printing operation that does not cause degradation of image quality cannot be performed by any conventional technique, unless a multi-value process is carried out.

SUMMARY

According to an aspect of the invention, there is provided an image processing apparatus including: an image information acquisition unit that obtains first print image information that is binarized with the use of a first threshold matrix; a threshold matrix information acquisition unit that obtains information representing the first threshold matrix; a determining unit that divides the first print image information obtained by the image information acquisition unit into a plurality of portions, and determines whether each of the divided portions includes contour information, based on the first threshold matrix obtained by the threshold matrix information acquisition unit; and a generating unit that generates a second print image information by performing a re-binarizing operation for each of the divided portions of the first print image information with the use of a second threshold matrix that is different from the first threshold matrix, based on the determination result of the determining unit.

BRIEF DESCRIPTION OF THE DRAWINGS

Exemplary embodiments of the present invention will be described in detail based on the following figures, wherein:

FIG. 7A shows the pixel values of the respective pixels in a cell formed with a plurality of pixels;

FIG. 7B shows the pixel values of the respective pixels in a cell formed with a plurality of pixels;

FIG. 7C shows a threshold matrix to be used for binarizing the value of the respective pixels in a cell;

FIG. 7D shows print image data that is obtained by binarizing the cells shown in FIG. 7A and FIG. 713 with the use of the threshold matrix shown in FIG. 7C;

FIG. 7E shows print image data that is obtained by binarizing the cells shown in FIG. 7A and FIG. 713 with the use of the threshold matrix shown in FIG. 7C;

FIGS. 9A through 9E illustrate a changing operation of a binarizing method that is performed regardless of the existence of edges of the original image;

FIGS. 11A through 11G schematically show image data in the respective steps in an operation that is performed by the binarizing method changing unit in accordance with the exemplary embodiment of the present invention;

DETAILED DESCRIPTION

The following is a description of exemplary embodiments of the present invention, with reference to the accompanying drawings.

Figure 1:
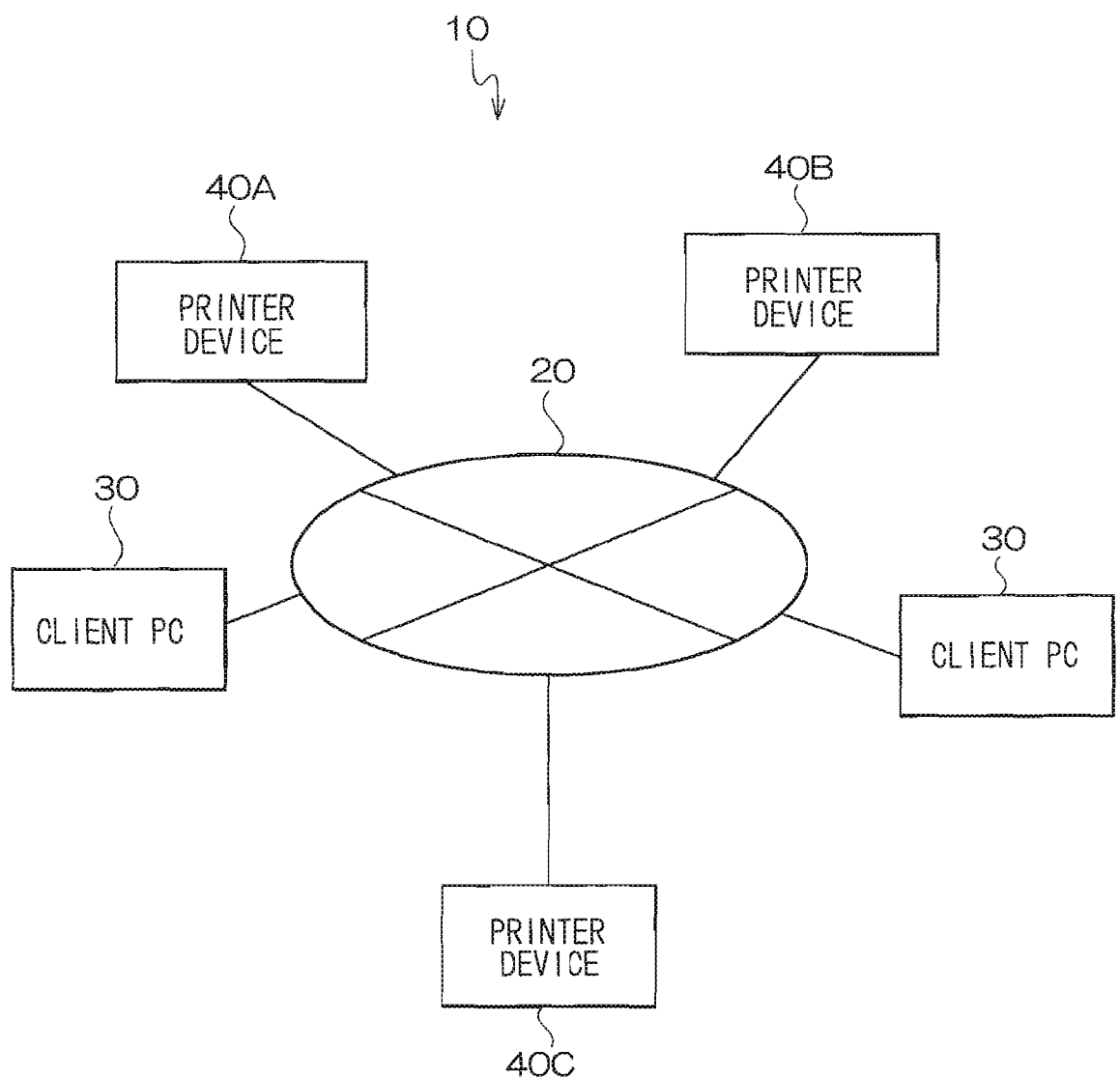
FIG. 1 schematically shows a printing system in accordance with an exemplary embodiment of the present invention.

FIG. 1 schematically shows the structure of a printing system 10 in accordance with this exemplary embodiment. As shovel in FIG. 1, in the printing system 10, two client PCs 30 that are personal computers (PCs), a printer device 40A, a printer device 40B, and a printer device 40C are connected to a network 20 such as a LAN.

In the printing system 10 in accordance with this exemplary embodiment, a print instruction can be transmitted from the client PC 30 to the printer device 40B. The print instruction includes data that is written in the page description language (PDL) (hereinafter referred to as the PDL data), and data that indicates the processing conditions for a print job to be executed (such as the number of copies, the sheet size to be used for the printing, and the operation mode (described later)).

Figure 2:
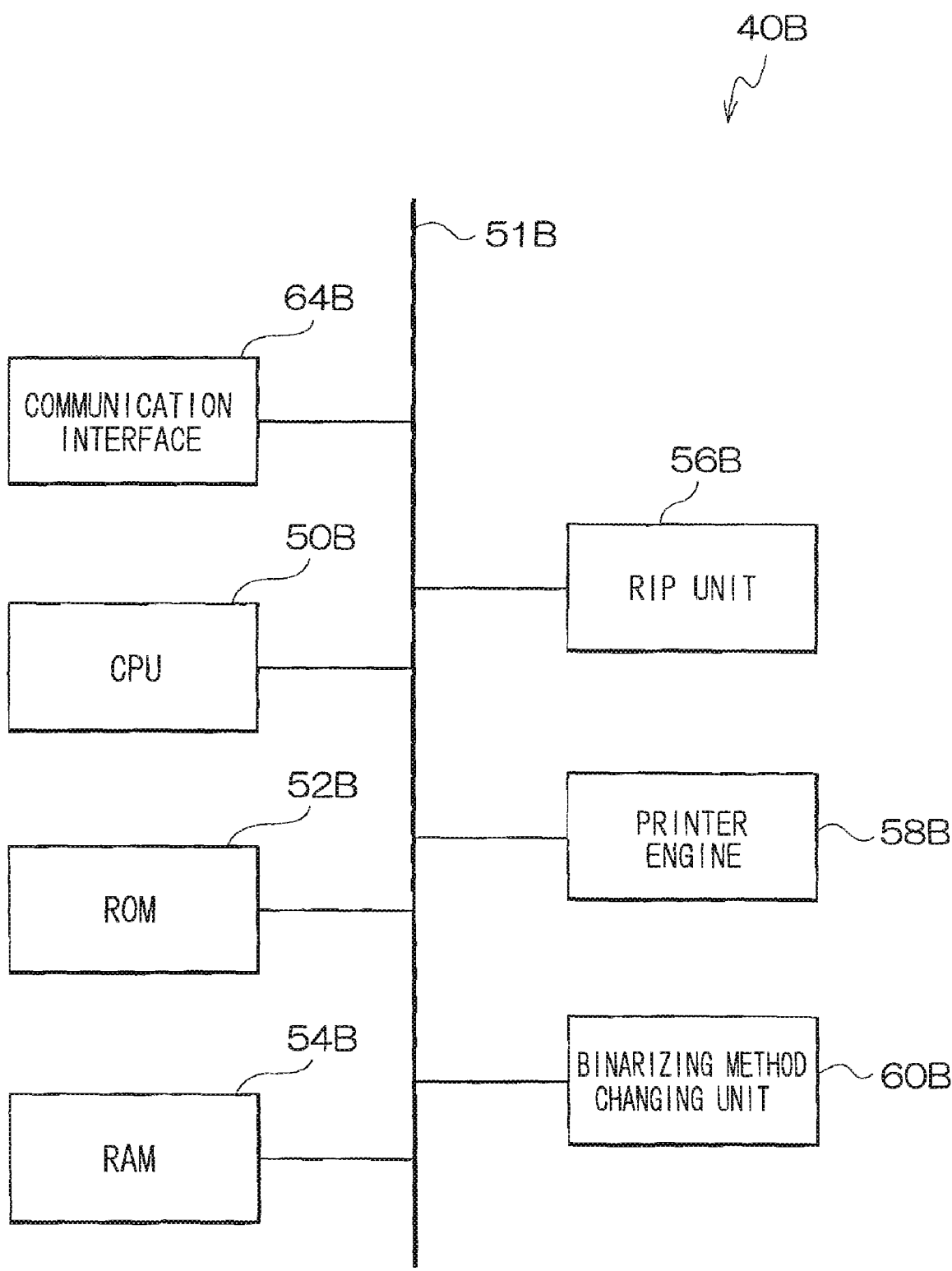
FIG. 2 is a block diagram showing the electric system of a printer device in accordance with the exemplary embodiment.

FIG. 2 is a block diagram showing the structure of the electric system of the printer device 40B. As shown in FIG. 2, the printer device 40B includes a CPU (Central Processing Unit) 50B that controls the operation of the entire device, a ROM 52B, a RAM 54B, and a communication interface 64B. The CPU SOB, the ROM 52B, the RAM 54B, and the communication interface 64B are connected to a bus 51B.

Various programs including the control program to be executed mostly by the CPU 50B to control the entire device and various kinds of data are stored beforehand in the ROM 52B. Also, various processing programs to be executed by the CPU SOB and various kinds of data are stored in the ROM 52. Various kinds of data to be used in the operation to be performed by the CPU SOB are temporarily stored in the RAM 54B.

The communication interface 64B is connected to the host computers (client PCs) 30 with lines or no lines via the network 20 or a communication line. The communication interface 64B is designed to receive a print instruction and image data that are transmitted from the host computers 30. The communication interface 64B is designed to transmit and receive print image data among the print devices 40A, 40B, and 40C.

The printer device 40B also includes a raster image processor (RIP) 56B and a printer engine 58B. The RIP unit 56B performs an expanding operation to expand PDL data into print image data. The RIP unit 56B and the printer engine 58B are connected to the bus 51B.

Based on image data that is transmitted from the host computers 30, the RIP unit 56B generates the print image data in accordance with the characteristics inherent to the printer engine 58B. The RIP unit 56B interprets the received PDL data, and performs a binarizing, operation for raster image data in a bitmap format. In this binarizing operation, a dither process using threshold matrix information (a threshold matrix B) stored in the ROM 52 is carried out, and binarizing according to the characteristics of the printer device (such as the printer engine 58B) is performed. By doing so, the print image data that is a binarized raster image is generated. The binarizing operation is performed for each page, and an RIP operation is performed to generate the print image data that can be used for printing by the print engine 58B.

The printer engine 58B is formed with a computer that includes a CPU that controls the entire operation of the printer engine 58B, a memory, and a nonvolatile memory device. Based on the print image data which is input, the printer engine 58B prints out the image represented by the print image data onto a paper sheet.

The printer engine 58B may be a printer engine of an electrophotographic type that forms an electrostatic latent image onto a photosensitive member by emitting light beams modulated according to the print image data onto the photosensitive member, and transfers and fixes a toner image, which is obtained by developing the electrostatic latent image with toner onto a paper sheet. In this manner, the image represented by the print image data is printed out onto a paper sheet. The printer engine 58B may also be a printer engine of some other type such as an ink jet type. The printer engine 58B is designed to print out binarized print image data.

The printer device 40B further includes a binarizing method changing unit 60B that changes the method for binarizing print image data that is transmitted from one of the other printer devices 40A and 40C. The binarizing method changing unit 60B is also connected to the bus 51B, and the operation of the binarizing method changing unit 60B is also controlled by the CPU 50B.

When the received print image data is print image data that is generated according to the characteristics of the printer engine provided in the printer device on the transmitting end, the method for binarizing the received print image data is changed so as to convert the received print image data into print image data compatible with the characteristics of the printer engine 58B of the printer device 40B on the receiving end.

Figure 3:
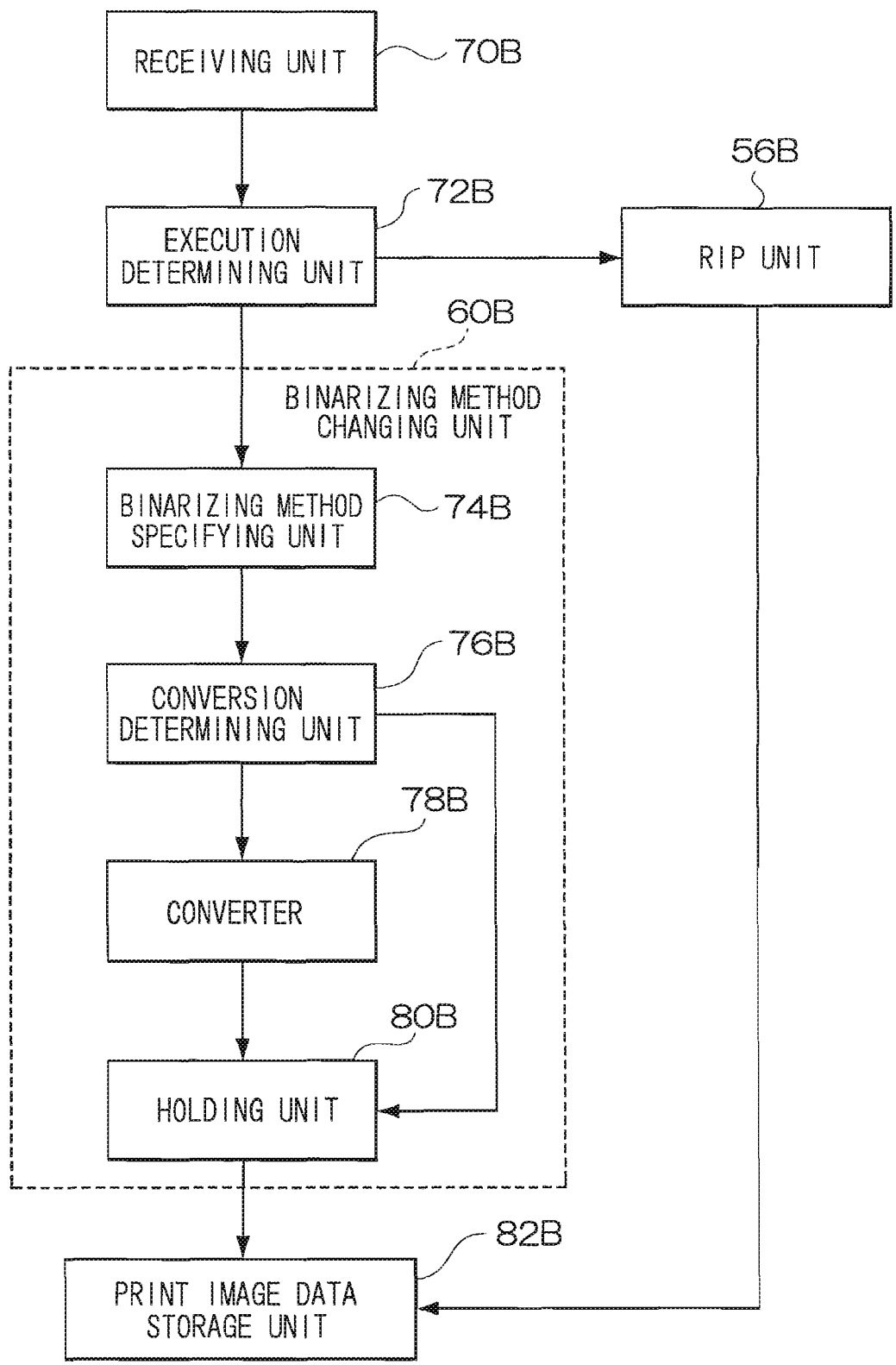
FIG. 3 is a functional block diagram concerning an operation to be performed by the printer device 40B after image data is received in accordance with the exemplary embodiment.

FIG. 3 is a functional block diagram concerning an image data receiving operation of the printer device 40B in accordance with this exemplary embodiment. Here, the image data includes the PDL data that is transmitted from the client PCs 30 and the print image data that is transmitted from the other printer devices 40A and 40C.

As shown in FIG. 3, the functional blocks of the image data receiving operation of the printer device 40B include a receiving unit 70B, an execution determining unit 72B, the RIP unit 56B, the binarizing method changing unit 60B, and a print image data storage unit 82B.

The receiving unit 70B is connected to the execution determining unit 72B, and the execution determining unit 72B is connected to the RIP unit 56B and the binarizing method changing unit 60B.

When receiving image data via the communication interface 64B, the receiving unit 70B temporarily stores the image data in a memory. The execution determining unit 72B determines whether the received image data is PDL data or print image data generated according to the characteristics of the printer engine provided in one of the printer devices 40A and 40C on the transmitting end. The execution determining unit 72B then determines whether to carry out an RIP or a binarizing method changing process as the process to be carried out on the received image data. In this determination, the received image data is determined whether to be print image data generated according to the printer engine provided in the printer device on the transmitting end, based on identification information such as a tag attached to the print image data. The identification information such as a tag is attached to the header portion of the print image data.

As the information indicating that the data is print image data generated according to the characteristics of the printer engine provided in a printer device on the transmitting end, the identification information may be separately transmitted from the printer device on the transmitting end.

The execution determining unit 72B outputs an instruction to the binarizing method changing unit 60B to change the method for binarizing the received image data, if the received image data is the print image data generated according to the characteristics of the printer engine provided in a printer device on the transmitting end.

When an instruction to change the binarizing method is input, the binarizing method changing unit 60B performs an operation (described later in detail) to change the method for binarizing the received image data in accordance with the characteristics of the printer engine 58B mounted in the printer device 40B. The binarizing method changing unit 60B then stores the image data binarized by the changed binarizing method in the print image data storage unit 82B as the print image data.

If the received image data is PDL data, the execution determining unit 72B outputs an instruction to the RIP unit 56B to generate print image data based on the received image data.

When the instruction to generate print image data is input, the RIP unit 56B interprets the received PDL data, performs the binarizing operation, and generates raster image data in a bitmap format. This binarizing operation is performed in accordance with the characteristics of the printer device, with the use of the threshold matrix B stored in the ROM 52B. In this manner, the print image data that is a binarized raster image is generated. Also, this binarizing operation is performed for each page. Print image data that can be used for printing by the printer engine 58B is generated through the binarizing operation, and the generated print image data is stored in the print image data storage unit 82B.

As described above, the raster image data that is binarized by the RIP unit 56B or the binarizing method changing unit 60B according to the characteristics inherent to the printer engine 58B mounted in the printer device 4013 is stored in the print image data storage unit 82B.

Figure 4:
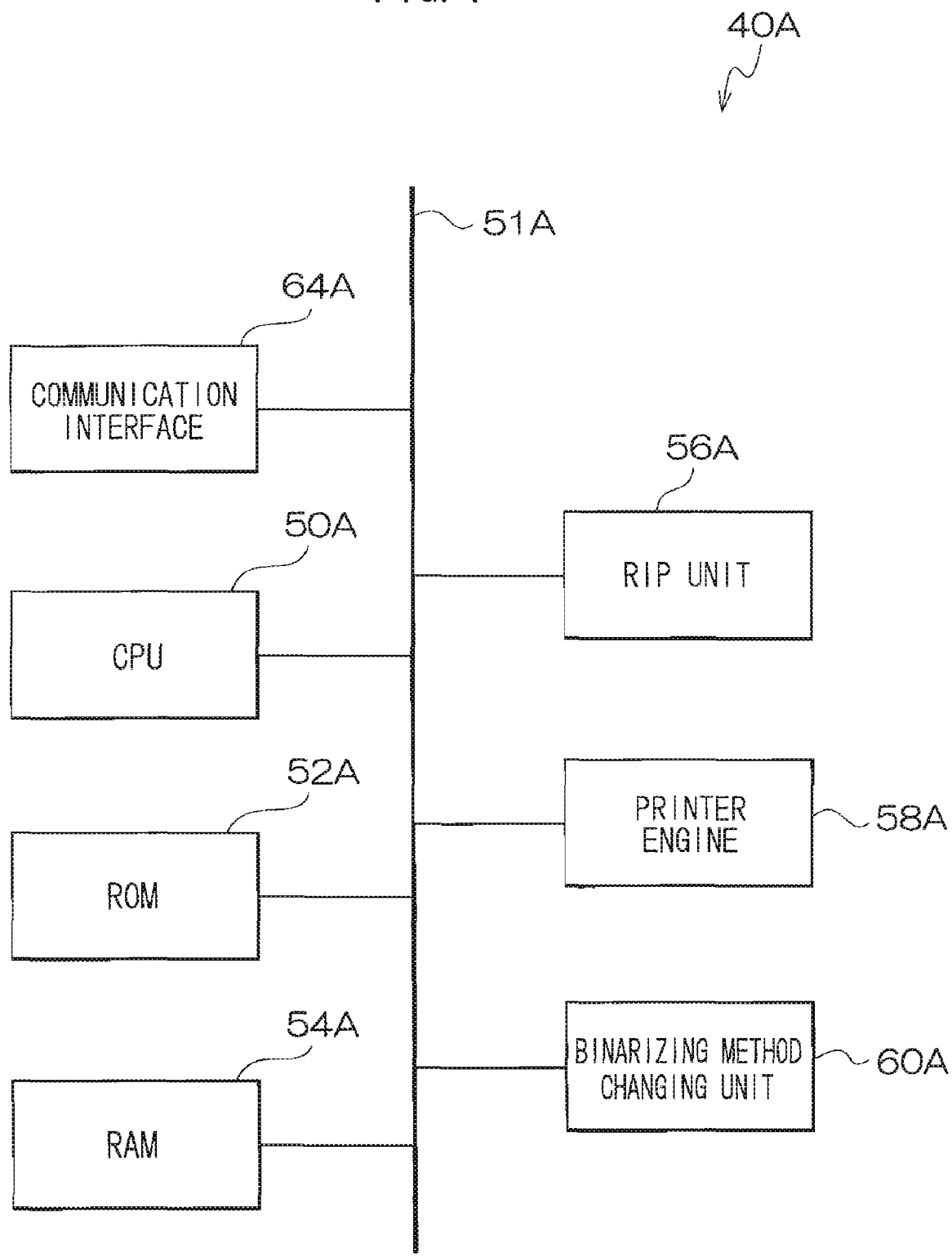
FIG. 4 is a block diagram showing the electric system of the printer device 40A in accordance with the exemplary embodiment.
Figure 5:
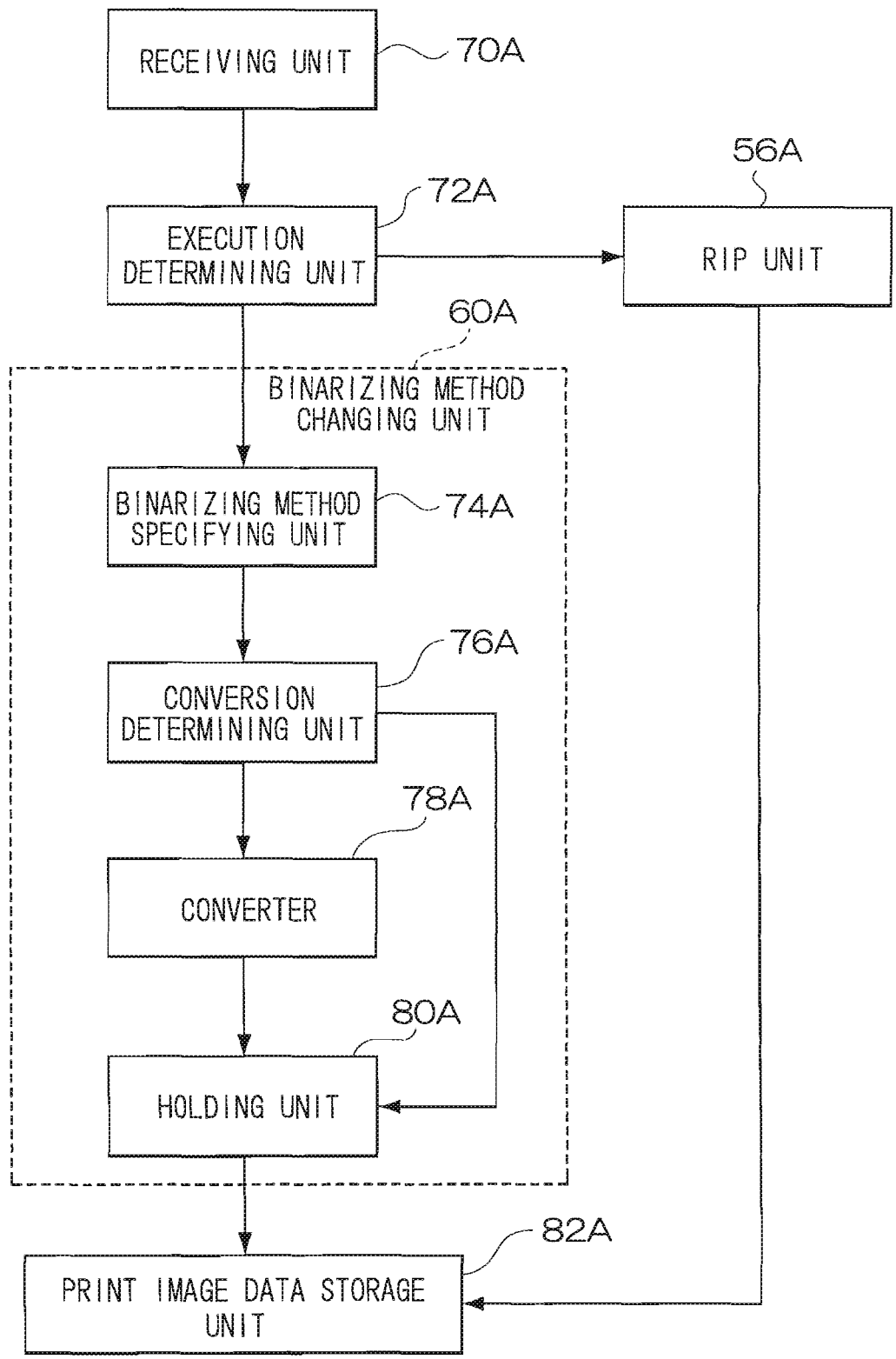
FIG. 5 is a functional block diagram concerning an operation to be performed by the printer device 40A after image data is received in accordance with the exemplary embodiment.

FIG. 4 is a block diagram showing the structure of the electric system of the printer device 40A. FIG. 5 is a functional block diagram concerning an image data receiving operation of the printer device 40A in accordance with this exemplary embodiment. The printer device 40A has the same structure as the printer device 40B. Therefore, the same components as those of the printer device 40B are denoted by the same reference numerals as those used for the printer device 40B, and explanation of them is omitted here.

The printer device 40A carries out a dither process with the use of threshold matrix information (a threshold matrix A) stored in the ROM 52A, and performs a binarizing operation according to the characteristics of the printer engine 58A or the like of the printer device 40A. In this manner, the printer device 40A generates print image data that is a binarized raster image.

Since the printer device 40C has the same structure as the printer device 40B and the printer device 40A, it is not shown in a drawing and explanation of it is omitted. The printer device 40C carries out a dither process with the use of threshold matrix information (a threshold matrix C) stored in the ROM 52C, and performs a binarizing operation according to the characteristics of the printer engine 58C or the like of the printer device 40C. In this manner, the printer device 40C generates print image data that is a binarized raster image.

In this exemplary embodiment, when print image data is transmitted from the printer device 40A to the printer device 40B, the information indicating the binarizing method to be utilized is attached to the tag or the like of the print image data and is transmitted.

The information indicating the binarizing method to be utilized may be threshold information used in a dither process, or the number of screen lines, the screen angle, the dot shape, and the likes used in a screen process. An example case where the threshold matrix information used in a dither process is added as the information indicating the binarizing method to be used in the printer device 40A is described in the following.

Referring now to FIGS. 6A through 8, the RIP operation to be performed by the RIP unit 56A in the printer device 40A is described.

Figure 6A:
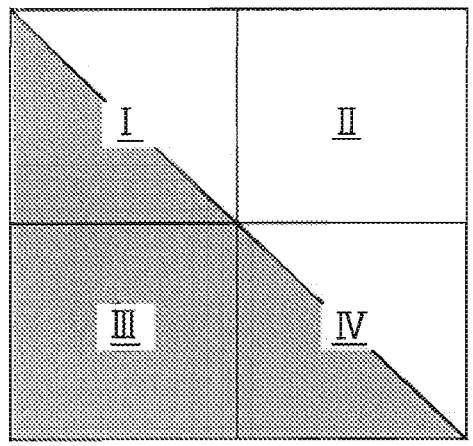
FIG. 6A shows divided portions of an image represented by PDL data.

The RIP unit 56A first performs a binarizing operation (an expanding operation) on an image represented by input PDL data (see FIG. 6A). In the example shown in FIG. 6A, the image obtained through the expanding operation is divided into the four cells I through IV. In FIGS. 6A through 6D, the concentration in the colored area is 50% (gray), with the concentration of a black area being 100% and the concentration of a white area being 0%.

Figure 6C:
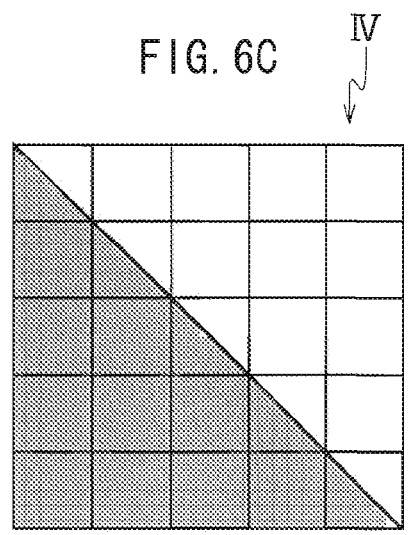
FIG. 6C is a conceptual diagram showing a process of converting one of the divided portions into image data formed with pixels.
Figure 6B:
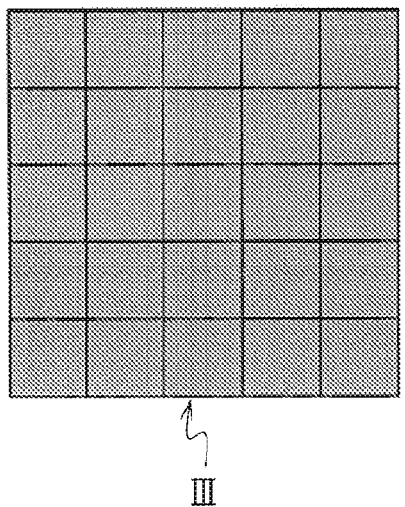
FIG. 6B is a conceptual diagram showing a process of converting one of the divided portions into image data formed with pixels.

The RIP unit 56A divides each cell into a plurality of portions (25 portions in the examples shown in FIGS. 6B through 6D) in accordance with the resolution or the like of the printer engine 58A, and each of the divided portions serves as one pixel (see FIGS. 6B and 6C).

Figure 6D:
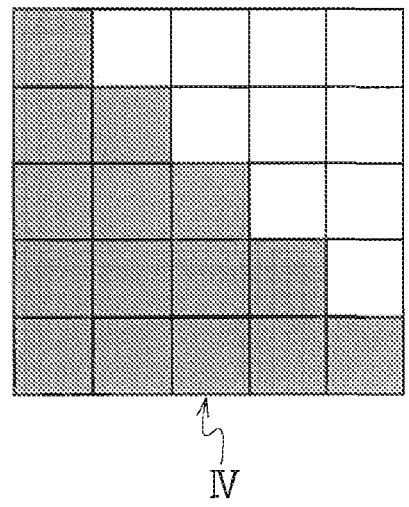
FIG. 6D is a conceptual diagram showing a process of converting one of the divided portions into image data formed with pixels.

When some pixels are partially overlapped by the image as shown in FIG. 6C, the color area rate of each of these pixels is made 50% or higher as shown in FIG. 6D.

The image is then binarized through a halftone process utilizing a dither method. The data indicating the concentration (%) of the respective pixels (see FIGS. 7A and 7B) is compared with the threshold matrix A (see FIG. 7C) representing the threshold values of the respective pixels that are set beforehand in accordance with the characteristics of the printer engine 58A, so that each pixel is converted into the image data of black or white.

Through the above operation, the cell III shown in FIG. 7A is binarized as shown in FIG. 7D, and the cell IV shown in FIG. 7B is binarized as shown in FIG. 7E.

Figure 8:
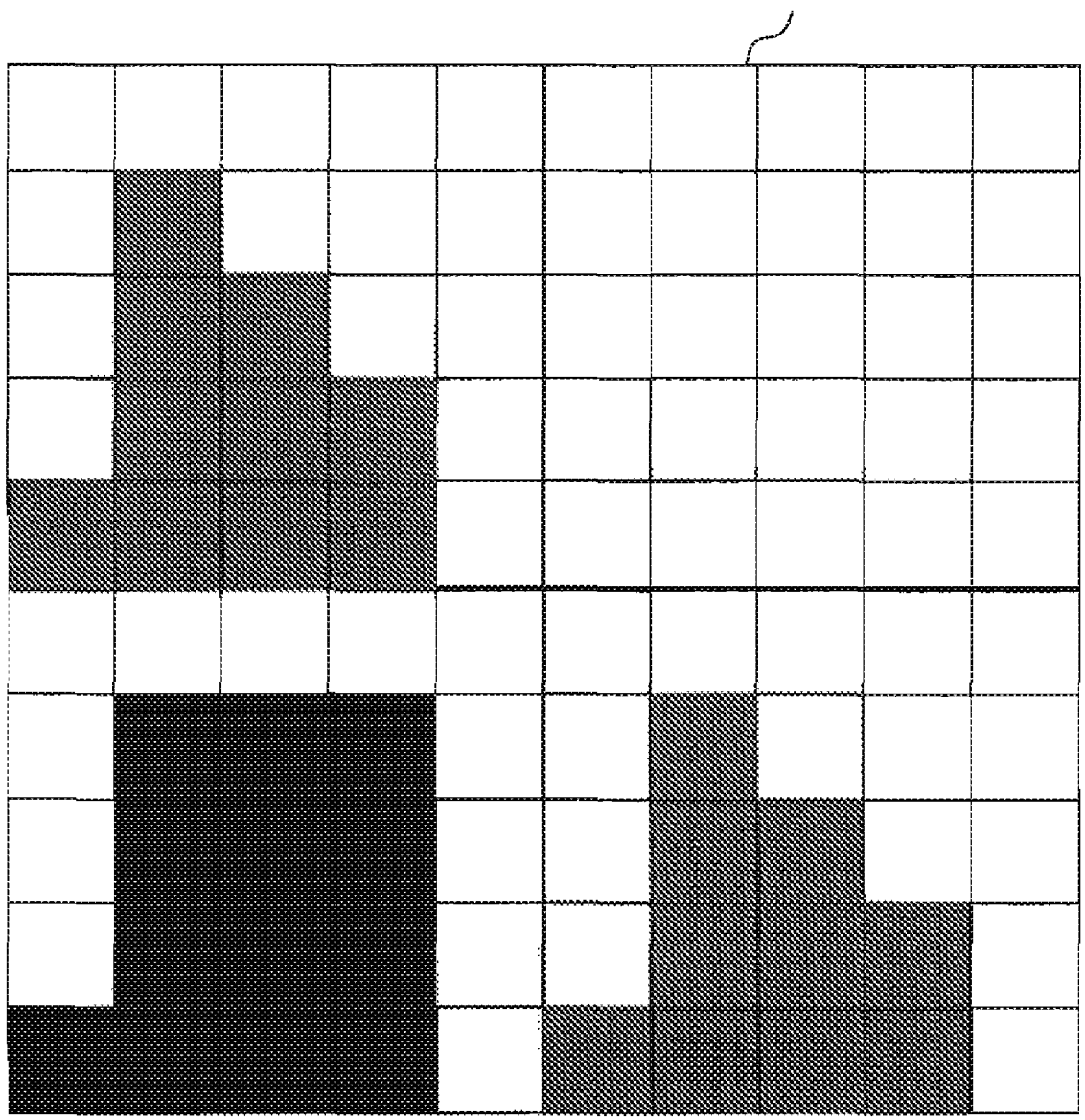
FIG. 8 shows an example of the print image data that is generated based on the PDL data of FIG. 6A as shown in FIG. 5.

FIG. 8 shows print image data A as example data that is generated based on the image shown in FIG. 6A and with the use of the threshold matrix A. More specifically, the 50% gray image shown in FIG. 6A is represented as a binarized image of white (0%) and black (100%) shown in FIG. 8 through an RIP operation. If a threshold matrix different from the threshold matrix A is used, the binarized image obtained through the RIP operation is of course different from the binarized image shown in FIG. 8.

When a printer device in which the threshold matrix B shown in FIG. 9C is set in advance receives the print image data A generated with the use of the threshold matrix A shown in FIG. 8, for example, the concentration of each cell in the original image is estimated by the following equation (1):

$$(\text{concentration in cell}) = (\text{number of black pixels in cell}) \div (\text{total number of pixels in cell}) \times 100 \qquad (1)$$

More specifically, in the cell III, there are 13 black pixels among the 25 pixels, as shown in FIG. 9A. Accordingly, the concentration of the cell III is 52%. Each pixel having a threshold value equal to or smaller than "52" in the threshold matrix B of FIG. 9C is converted into a black pixel, and each pixel having a threshold value equal to or larger than "53" is converted into a white pixel, as shown in FIG. 9D.

The same operation is performed on the cell IV shown in FIG. 9B. Since there are 10 black pixels among the 25 pixels, the concentration is estimated as 40%. Each pixel having a threshold value equal to or smaller than "40" in the threshold matrix B of FIG. 9C is converted into a black pixel, and each pixel having a threshold value equal to or larger than "41" is converted into a white pixel, as shown in FIG. 9E. In this manner, a re-binarizing operation using the threshold matrix B according to the characteristics of the printer engine 58B of the printer device 40B is performed on the print image data A generated with the use of the threshold matrix A. Thus, a re-binarizing operation according to the characteristics inherent to the printer engine 58 of the printer device 40B can be performed.

Figure 10:
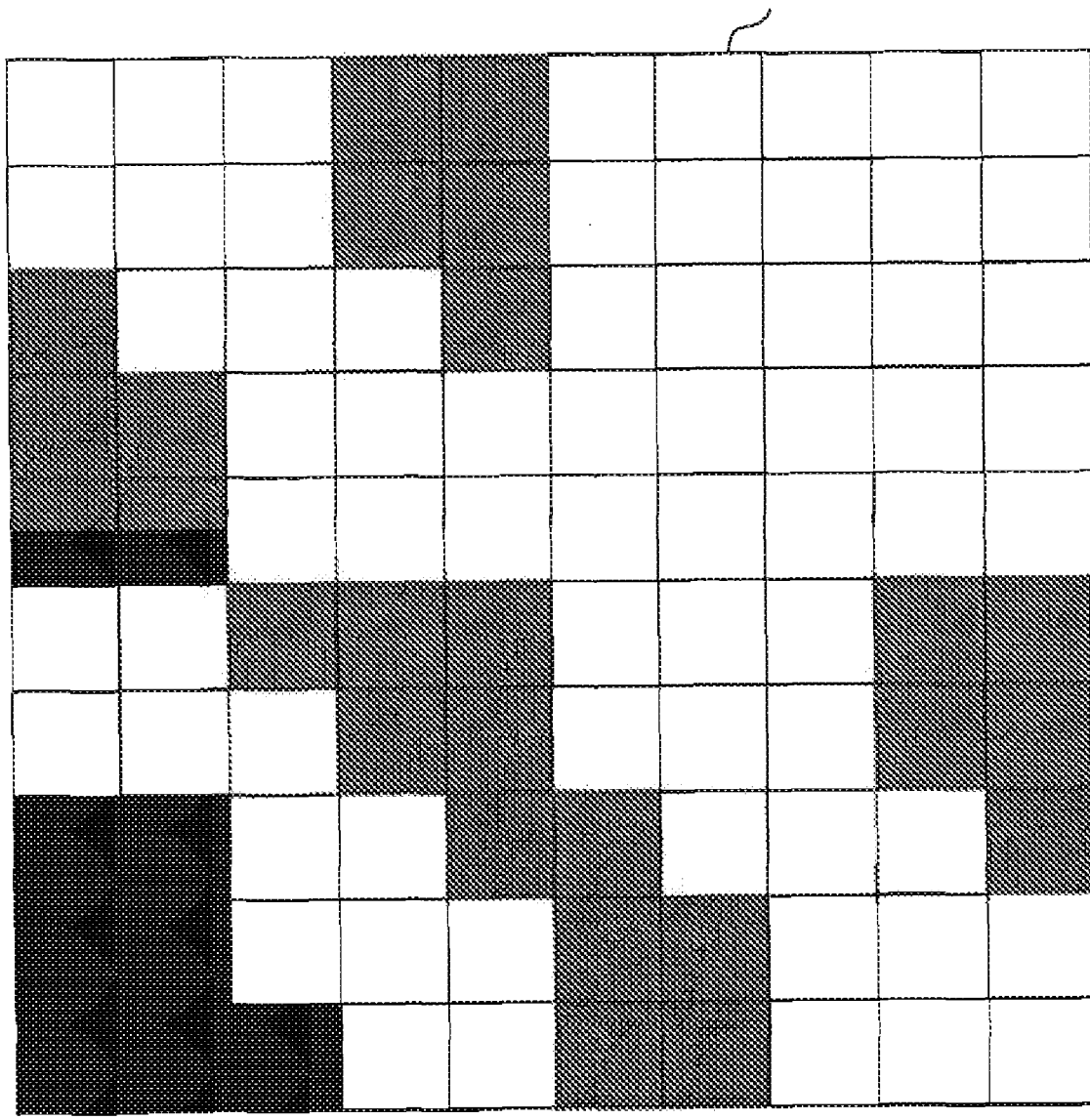
FIG. 10 shows an example of converted data that is obtained where the binarizing method for the image data shown in FIG. 6A is changed regardless of the positions of edges in the image.

FIG. 10 shows converted data C that are obtained as a result of the procedures shown in FIGS. 9A through 9E. As shown in FIG. 10, the edges shown in the original image (FIG. 6A) and the edges shown in the image (FIG. 8) represented by the received print image data A are lost in the converted data C, though the converted data C is compatible with the characteristics inherent to the printer engine 58B. As a result, a blurred image is obtained.

To counter this problem, the binarizing method changing unit 60B of this exemplary embodiment includes a binarizing method specifying unit 74B, a conversion determining unit 76B, a converter 78B, and a holding unit 80B as functional blocks.

Based on the received print image data A, the binarizing method specifying unit 74B specifies a binarizing method. To specify a binarizing method, the binarizing method specifying unit 74B analyzes the tag or the like attached to the print image data A, and obtains the threshold matrix information (the threshold matrix A) used in the RIP operation.

The conversion determining unit 76B determines whether edges are contained in each cell. The conversion determining unit 76B determines that a cell containing no edges is a cell to be converted with the use of the threshold matrix B, and instructs the converter 78B to convert the cell with the use of the threshold matrix B. Meanwhile, the conversion determining unit 76B determines that a cell containing edges is a cell not to be converted with the use of the threshold matrix B.

Referring now to FIGS. 11A through 11G, a method for determining whether edges are contained is described. In FIG. 11A, black pixels in the cell III are laid on the threshold matrix A, and are shown in bold frames. As shown in FIG. 11A, the maximum value ThBmax of the threshold values for black pixels in the threshold matrix A is "50", and the minimum value ThWmin of the threshold values for white pixels in the threshold matrix A is "54". Since all the pixels having smaller threshold values than ThBmax are regarded as black pixels, this cell is considered to be monotonous as a whole.

Accordingly, the cell III shown in FIG. 11C is determined to be converted with the use of the threshold matrix B shown in FIG. 11E.

Meanwhile, in FIG. 11B, black pixels in the cell IV are laid on the threshold matrix A, and are shown in bold frames. As shown in FIG. 11B, the maximum value ThBmax of the threshold values for black pixels in the cell IV in the threshold matrix A is "50", and the minimum value ThWmin of the threshold values for white pixels in the cell IV in the threshold matrix A is "22".

The pixels indicated by x in FIG. 11D are white pixels, though the threshold values of those pixels are smaller than ThBmax. Accordingly, those pixels should originally have values for white pixels. In view of this, it is estimated that white pixels and black pixels exist in the cell IV, and there are the edges of the image.

Although there are white pixels, the concentration of the image in the cell is 40% in accordance with the equation (1). Therefore, this cell is considered not to be monotonous, and the contour (some edges) of the image should exist in the cell.

In the cell IV that is considered to include edges, a conversion using the threshold matrix B is not performed, but the data of the cell IV is retained as print image data B in the holding unit 80B, as shown in FIG. 11G.

Using the equation (1), the converter 78B calculates the concentration of a cell, which is to be processed, of the received print image data (data that is generated with the use of the threshold matrix A). Using the threshold matrix 13, the converter 78B converts pixels having threshold values equal to or smaller than the threshold value according to the calculated concentration into black pixels, and converts pixels having threshold values equal to or higher than the calculated concentration into white pixels. In this manner, the converter 78B performs a binarizing operation with use of the threshold matrix B.

For example, in the cell III shown in FIG. 11C, thirteen pixels among the 25 pixels are black pixels. Accordingly, the concentration of the cell III is determined to be 52%. With the threshold matrix B shown in FIG. 11E being applied, the cell III shown in FIG. 11F is converted into the cell shown in FIG. 11F.

In the holding unit 80B, the print image data that is converted with the use of the threshold matrix B according to the characteristics of the printer engine 58B is stored, while the contour of the image is maintained. After the data of all the cells of the received print image data is retained in the holding unit 80B, the retained print image data is collectively stored as print image data B in the print image data storage unit 82B.

Figure 12:
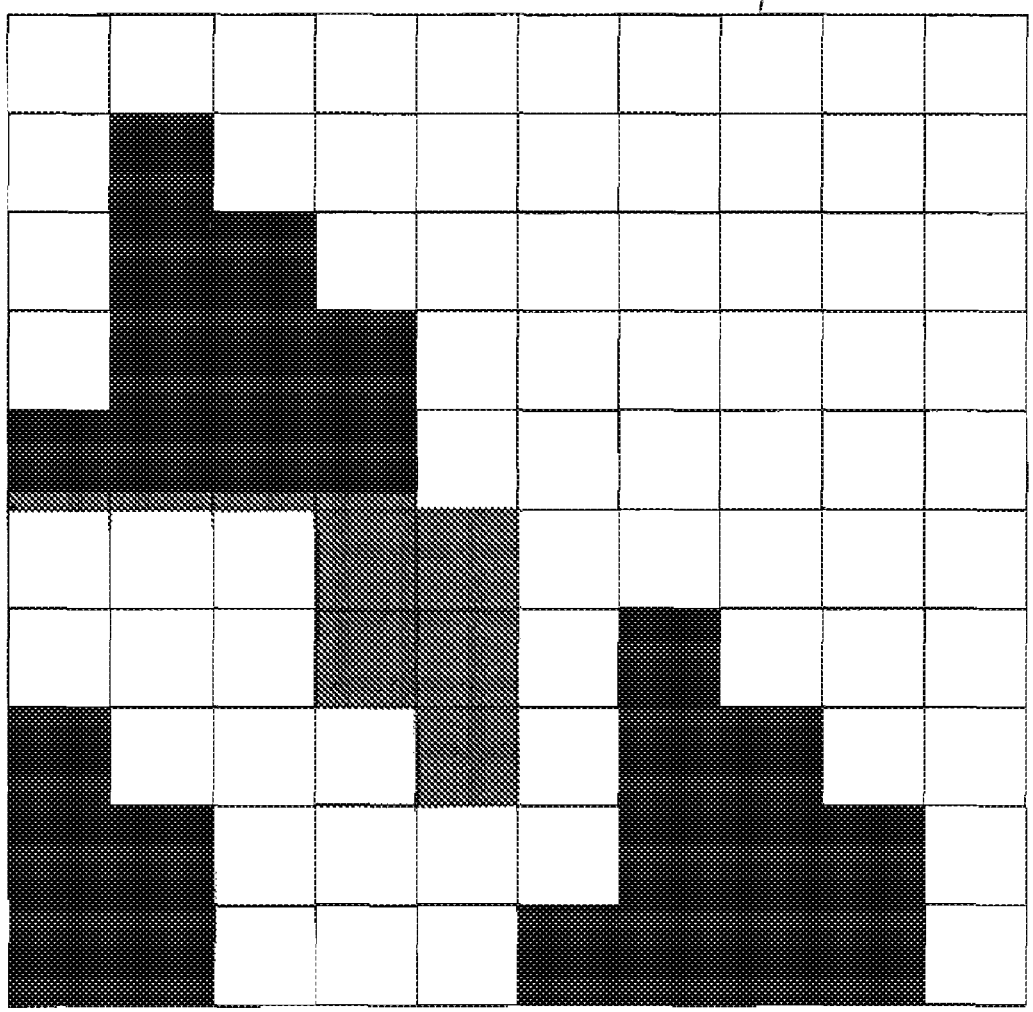
FIG. 12 shows an example of the print image data that is observed after the binarizing method is changed by the binarizing, method changing unit in accordance with the exemplary embodiment.

FIG. 12 shows the print image data B that is obtained in the above-described manner. As shown in FIG. 12, in the print image data B that is output from the binarizing method changing unit 60B, the deformation of the contour of the original image shown in FIG. 6A is smaller than the deformation observed in the converted data C shown in FIG. 10.

Next, the functions of this exemplary embodiment are described.

When the printer device 40B receives image data from an external device such as one of the client PCs 30 or the printer device 40A or 40C via the communication interface 64B, the CPU 50B analyzes the received image data. In the analysis, the received image data is determined to be print image data binarized according to the characteristics inherent to the printer device 40A or 40C, or PDL data.

If the received image data is PDL data, the RIP unit 56B performs an RIP operation (FIGS. 6A through 6D and FIGS. 7A through 7E, for example) for the PDL data to generate print image data (see FIG. 8).

If the received image data is print image data that is binarized according to the characteristics inherent to the printer device 40A or 40C, the binarizing method changing unit 60B performs a binarizing method changing operation.

Figure 13:
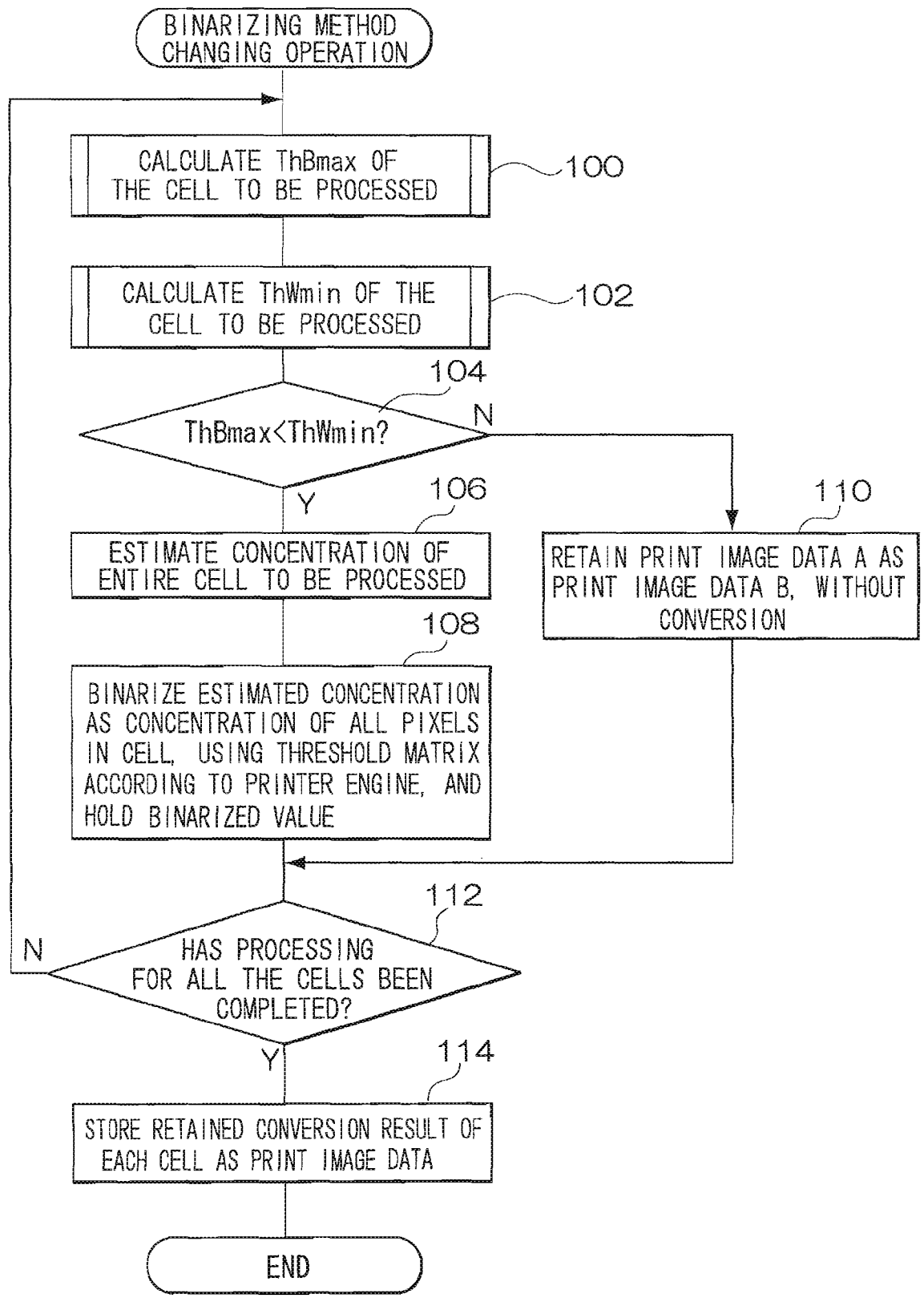
FIG. 13 is a flowchart of the binarizing method changing operation in accordance with the exemplary embodiment.

FIG. 13 is a flowchart of a binarizing method changing operation to be performed by the binarizing method changing unit 60B, with each cell of print image data being processed. Referring now to FIG. 13, the binarizing method changing operation in accordance with this exemplary embodiment is described.

In step 100, the maximum value ThBmax of the threshold value for the black pixels in a cell to be processed is detected. In step 102, the minimum value ThWmin of the threshold value for the white pixels in the cell to be processed is detected (see FIG. 11A and FIG. 11B, for example).

In step 104, the maximum value ThBmax is compared with the minimum value ThWmin, to determine whether the maximum value ThBmax is smaller. If the maximum value ThBmax is determined to be smaller than the minimum value ThWmin, the operation moves on to step 106. If the maximum value ThBmax is determined not to be smaller than the minimum value ThWmin, the operation moves on to step 110.

In step 106, the concentration of the entire cell to be processed is estimated, and the operation moves on to step 108. In step 108, the value of all the pixels in the cell is equivalent to the value corresponding to the estimated concentration, and the pixels in the cell are binarized (see FIG. 11F, for example) with the use of the threshold matrix (see FIG. 11E, for example) according to the printer engine. The binarized values are retained, and the operation moves on to step 112.

The estimated concentration can be obtained through a calculation using the above equation (1).

In step 110, the data of each pixel in the print image data A is not converted and is retained as the data of each pixel in the print image data B (see FIG. 11G for example), and the operation moves on to step 112.

In step 112, a check is made to determine whether processing has been performed for all the cells of the received image data. If the processing has not been performed for all the cells of the received image data, the operation returns to step 100.

If the processing is determined to have been performed for all the cells of the received image data in step 112, the operation moves on to step 114, and the retained conversion result (see FIG. 12, for example) of each cell is stored as print image data. This binarizing method changing operation then comes to an end.

In this manner, in the binarizing method changing operation shown in FIG. 13, a check is made for each cell to determine whether the print image data A should be converted.

Figure 14:
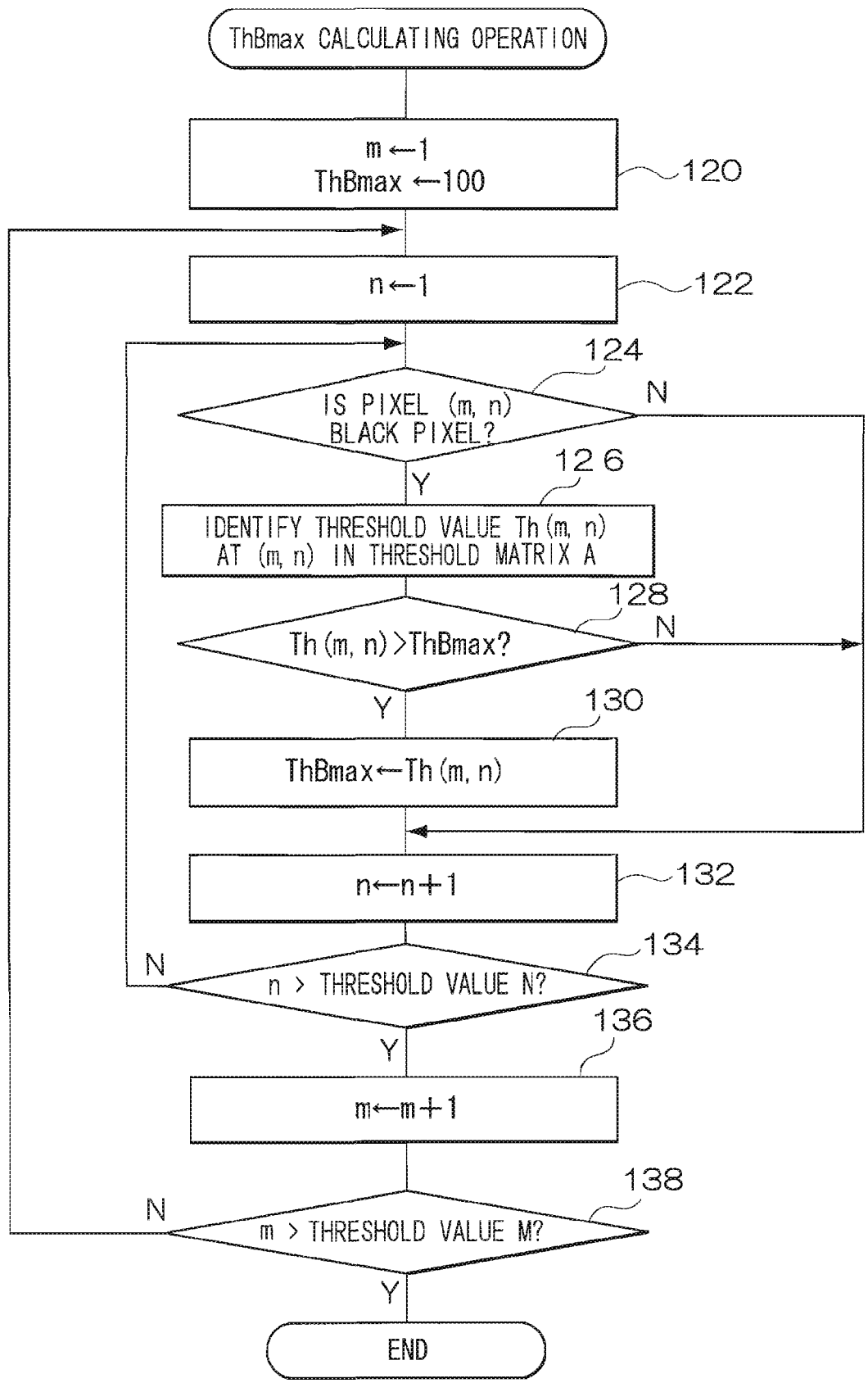
FIG. 14 is a flowchart of a ThBmax calculating operation to be performed in the binarizing method changing operation in accordance with the exemplary embodiment.

FIG. 14 is a flowchart showing a ThBmax calculating routine (step 100 of FIG. 13) in the binarizing method changing operation. Referring now to FIG. 14, the ThBmax calculating operation in accordance with this exemplary embodiment is described.

In step 120, a variable m is set at "1", and ThBmax is set at "0". In step S122, a variable n is set at "1".

In step 124, a check is made to determine whether the pixel at the location (m, n) in the cell to be processed (the pixel on the m'th column from the left and the n'th row in the cell) is a black pixel. If the pixel is determined to be a black pixel, the operation moves on to step 126, and the value of the threshold value Th (m, n) at the location (m, n) in the threshold matrix A is specified. In step 128, Th (m, n) is compared with ThBmax, to determine whether Th (m, n) is larger than ThBmax.

If Th (m, n) is determined to be larger than ThBmax in step 128, the operation moves on to step 130. The value of Th (m, n) is then set to ThBmax in step 130, and the operation moves on to step 132.

If the pixel at the location (m, n) in the cell to be processed is determined not to be a black pixel in step 124, the procedures of steps 126 through 130 are skipped, and the operation moves on to step 132.

If Th (m, n) is determined not to be larger than ThBmax in step 128, the procedure of step 130 is skipped, and the operation moves on to step 132.

In step 132, the variable n is incremented. In step 134, a check is made to determine whether the variable n is larger than a threshold value N. If the variable n is determined not to be larger than the threshold value N, the operation returns to step 124. If the variable n is determined to be larger than the threshold value N in step 134, the operation moves on to step 136.

In step 136, the variable m is incremented, and the operation moves on to step 138. In step 138, a check is made to determine whether the variable m is larger than a threshold value M. If the variable m is determined not to be larger than the threshold value M in step 138, the operation returns to step 122. If the variable m is determined to be larger than the threshold value M in step 138, this ThBmax calculating routine comes to an end.

The threshold value M and the threshold value N are values in accordance with the number of pixels in one cell. In the example case shown in FIGS. 6A through 12, the threshold value M is 5, and the threshold value N is 5.

The threshold value M, the threshold value N, and the number of pixels in each one cell depend on the threshold matrix used in the binarizing operation.

Figure 15:
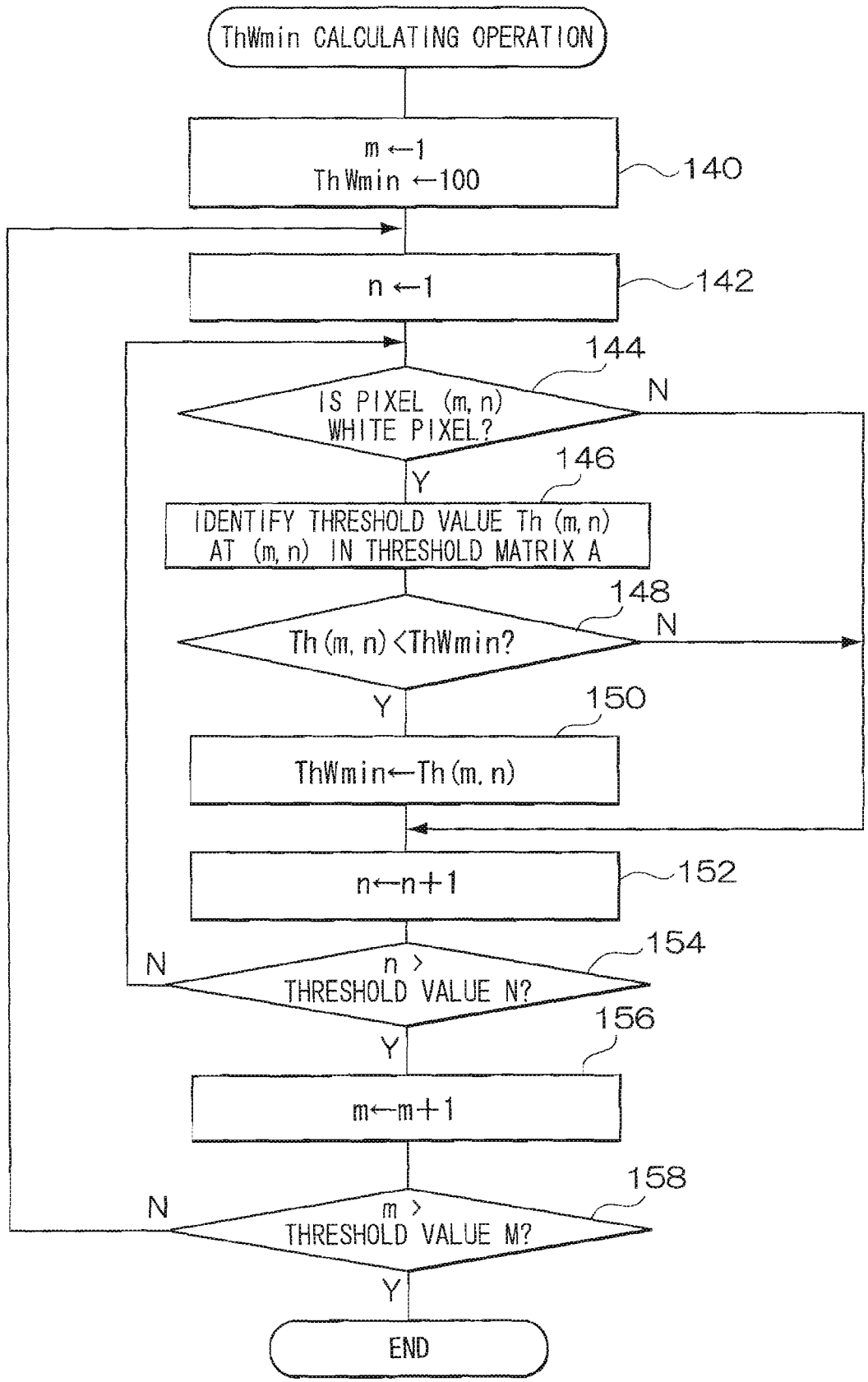
FIG. 15 is a flowchart of a ThWmin calculating operation to be performed in the binarizing method changing operation in accordance with the exemplary embodiment.

FIG. 15 is a flowchart showing a ThWmin calculating routine (step 102 of FIG. 13) in the binarizing method changing operation. Referring now to FIG. 15, the ThWmin calculating operation in accordance with this exemplary embodiment is described.

In step 140, a variable m is set at "1", and ThWmin is set at "100". In step S142, a variable n is set at "1".

In step 144, a check is made to determine whether the pixel at the location (m, n) in the cell to be processed is a white pixel. If the pixel is determined to be a white pixel, the operation moves on to step 146, and the value of the threshold value Th (m, n) at the location (m, n) in the threshold matrix A is specified. In step 148, Th (m, n) is compared with ThWmin, to determine whether Th (m, n) is smaller than ThWmin.

If Th (m, n) is determined to be smaller than ThWmin in step 148, the operation moves on to step 150. The value of Th (m, n) is then set to ThWmin in step 150, and the operation moves on to step 152.

If the pixel at the location (m, n) in the cell to be processed is determined not to be a white pixel in step 144, the procedures of steps 146 through 150 are skipped, and the operation moves on to step 152.

If Th (m, n) is determined not to be smaller than ThWmin in step 148, the procedure of step 150 is skipped, and the operation moves on to step 152.

In step 152, the variable n is incremented. In step 154, a check is made to determine whether the variable n is larger than a threshold value N. If the variable n is determined not to be larger than the threshold value N in step 154, the operation returns to step 144. If the variable n is determined to be larger than the threshold value N in step 154, the operation moves on to step 156.

In step 156, the variable m is incremented, and the operation moves on to step 158. In step 158, a check is made to determine whether the variable m is larger than a threshold value M. If the variable m is determined not to be larger than the threshold value M in step 158, the operation returns to step 142. If the variable m is determined to be larger than the threshold value M in step 158, this ThWmin calculating routine comes to an end.

In this exemplary embodiment, the printer device 40B includes the binarizing method changing unit 60B. However, the present invention is not limited to this exemplary embodiment. For example, a terminal for changing the binarizing method may be connected to the network 20, and transmission and reception of print image data may be performed via the terminal. In this manner, the binarizing method can be changed.

Also, in this exemplary embodiment, the threshold matrix information (the threshold matrix A) used on the transmitting end is attached to the tag of image data. However, the threshold matrix information may be obtained through a communication. Alternatively, a plurality of threshold matrixes to be used in printer devices may be stored in advance, and a suitable one of the threshold matrixes may be read out and used in accordance with the transmitting end.

Examples of image processing operations using threshold matrixes include image processing operations and screen processing operations using the dither method or the error diffusion method. Those operations may also be suitably combined.

Figure 16:
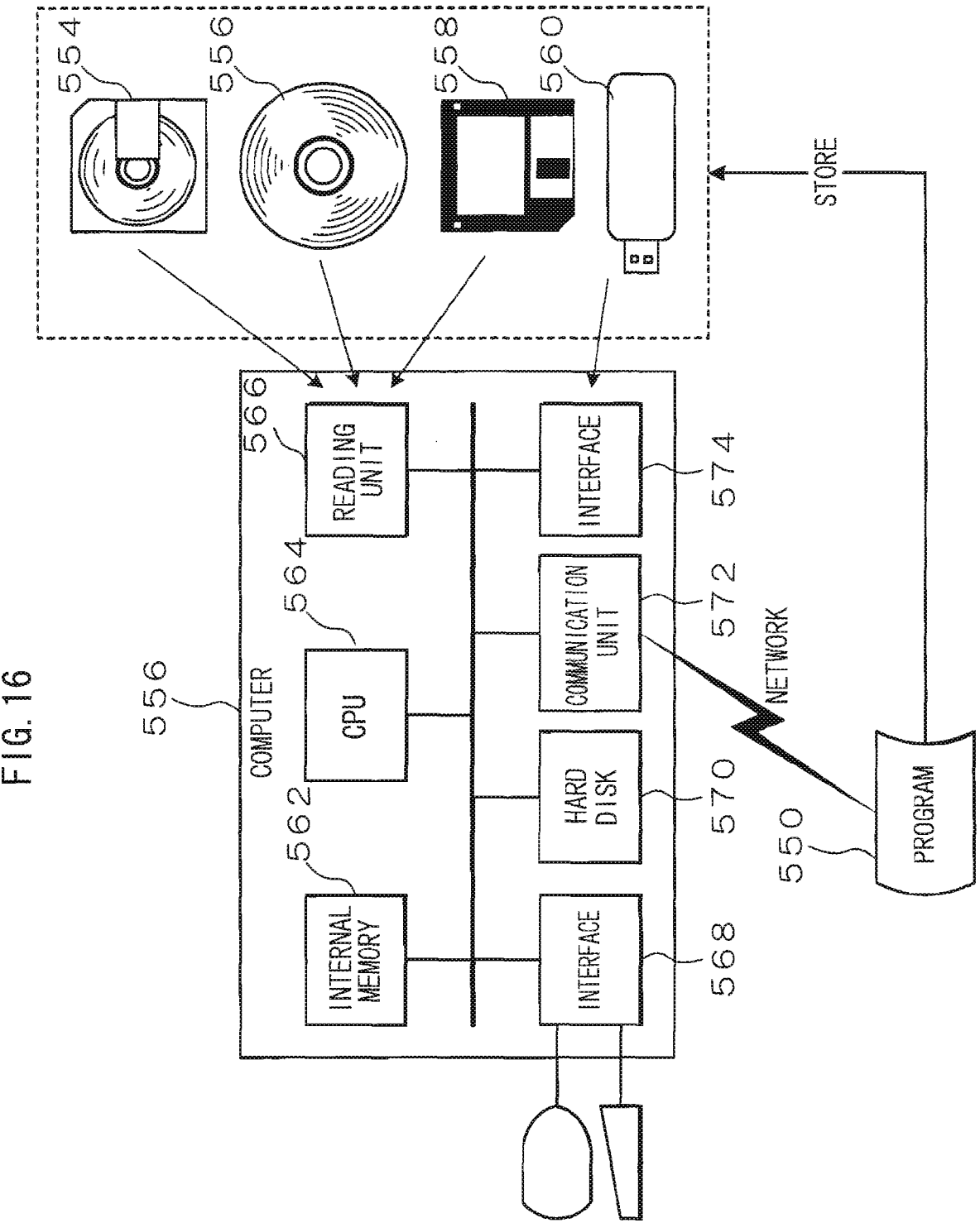
FIG. 16 shows an example of a system that includes a computer program, a recording medium storing the computer program, and a computer in a case where the function of the binarizing method changing operation of the image processing apparatus in accordance with the exemplary embodiment is realized by the computer program.

FIG. 16 shows an example of a system that includes a computer program, a recording medium storing the computer program, and a computer in a case where the function of the binarizing method changing operation of the image processing apparatus in accordance with this exemplary embodiment is realized by the computer program. In FIG. 16, reference numeral 550 indicates the program, 552 the computer, 554 a magneto-optical disk, 556 an optical disk, 558 a magnetic disk, 560 a memory, 562 an internal memory, 566 a reading unit, 570 a hard disk, 568 and 574 interfaces, and 572 a communication unit.

A part or all of the function of each component of the printer devices described above may be realized by the program 550 that can be executed by a computer. In such a case, the program 550 and the data to be used by the program can be stored in a computer readable recording medium. The recording medium used here should be able to cause a change in the magnetic, optical, or electric energy in the reading unit 566 provided in the hardware resource of the computer in accordance with the contents of the program. The recording medium should then transmit the contents of the program in the form of suitable signals to the reading unit 566. The recording medium may be the magneto-optical disk 554, the optical disk 556 (such as a CD or a DVD), the magnetic disk 558, or the memory 560 (such as an IC card or a memory card), for example. The recording medium is of course not limited to those portable types.

The program 550 is stored in those recording media. Those recording media are mounted in the reading unit 566 or the interface 574 of the computer 552, for example. The program 550 is read out from the computer 552, and is stored in the internal memory 562 or the hard disk 570. The program 550 is then executed by the CPU 564, so as to realize the functions of each printer device in accordance with this exemplary embodiment. Alternatively, the program 550 may be transferred to the computer 552 via a network or the like, and the computer 552 receives the program 550 at the communication unit 572. The program 550 is then stored in the internal memory 562 or the hard disk 570, and is executed by the CPU 564, so as to realize the functions of a printer device of this exemplary embodiment. The computer 552 may be connected to other various devices via the interface 568. For example, a display device that displays information, an input device through which users input information, and others may be connected to the computer 552.

It is of course possible to form some of the functions with the hardware or to form all of the functions with the hardware. It is also possible to employ a program that is executed to realize other functions as well as the present invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image information acquisition unit that obtains first print image information that is binarized with the use of a first threshold matrix;
    a threshold matrix information acquisition unit that obtains information representing the first threshold matrix;
    a determining unit that divides the first print image information obtained by the image information acquisition unit into a plurality of portions, and determines whether each of the divided portions includes contour information, based on the first threshold matrix obtained by the threshold matrix information acquisition unit; and
    a generating unit that generates second print image information by performing a re-binarizing operation for each of the divided portions of the first print image information with the use of a second threshold matrix that is different from the first threshold matrix, based on a determination result of the determining unit.

2. The image processing apparatus of claim 1, wherein the generating unit does not perform the re-binarizing operation for the divided portions of the first print image information determined to include the contour information by the determining unit, and sets the divided portions of the first print image information determined to include the contour information by the determining unit as divided portions corresponding to the second print image information.

3. The image processing apparatus of claim 1, further comprising
    a calculating unit that calculates a mean value of pixels in each of the divided portions of the first print image information determined not to include the contour information by the determining unit,
    wherein the generating unit sets the mean value of each of the divided portions calculated by the calculating unit as the value of each pixel in each of the divided portions determined not to include the contour information by the determining unit, and the generating unit performs the re-binarizing operation for the divided portions using the second threshold matrix different from the first threshold matrix.

4. The image processing apparatus of claim 2, further comprising
    a calculating unit that calculates a mean value of pixels in each of the divided portions of the first print image information determined not to include the contour information by the determining unit,
    wherein the generating unit sets the mean value of each of the divided portions calculated by the calculating unit as the value of each pixel in each of the divided portions determined not to include the contour information by the determining unit, and the generating unit performs the re-binarizing operation for the divided portions using the second threshold matrix different from the first threshold matrix.

5. The image processing apparatus of claim 1, wherein the determining unit compares the first print image information with a threshold value of the first threshold matrix in each of the divided portions, to specify a maximum value of threshold values corresponding to black pixels larger than the threshold value and a minimum value of threshold values corresponding to white pixels not larger than the threshold value, and the determining unit determines that a divided portion in which the minimum value of threshold values corresponding to the white pixels is not larger than the maximum value of threshold values corresponding to the black pixels includes the contour information.

6. The image processing apparatus of claim 2, wherein the determining unit compares the first print image information with a threshold value of the first threshold matrix in each of the divided portions, to specify a maximum value of threshold values corresponding to black pixels larger than the threshold value and a minimum value of threshold values corresponding to white pixels not larger than the threshold value, and the determining unit determines that a divided portion in which the minimum value of threshold values corresponding to the white pixels is not larger than the maximum value of threshold values corresponding to the black pixels includes the contour information.

7. The image processing apparatus of claim 3, wherein the determining unit compares the first print image information with a threshold value of the first threshold matrix in each of the divided portions, to specify a maximum value of threshold values corresponding to black pixels larger than the threshold value and a minimum value of threshold values corresponding to white pixels not larger than the threshold value, and the determining unit determines that a divided portion in which the minimum value of threshold values corresponding to the white pixels is not larger than the maximum value of threshold values corresponding to the black pixels includes the contour information.

8. The image processing apparatus of claim 4, wherein the determining unit compares the first print image information with a threshold value of the first threshold matrix in each of the divided portions, to specify a maximum value of threshold values corresponding to black pixels larger than the threshold value and a minimum value of threshold values corresponding to white pixels not larger than the threshold value, and the determining unit determines that a divided portion includes the contour information when the minimum value of threshold values corresponding to the white pixels is not larger than the maximum value of threshold values corresponding to the black pixels.

9. The image processing apparatus of claim 1, wherein the first print image information and the second print image information are both raster image data in a bitmap format.

10. An image processing method comprising:
obtaining first print image information that is binarized with the use of a first threshold matrix;
obtaining information that represents the first threshold matrix;
dividing the first print image information into a plurality of divided portions, and determining whether each of the divided portions include contour information, based on the first threshold matrix; and
generating second print image information by performing a re-binarizing operation for each of the divided portions of the first print image information with the use of a second threshold matrix that is different from the first threshold matrix, based on a determination result.

11. A printer device comprising:
an image information acquisition unit that obtains first print image information that is binarized with the use of a first threshold matrix;
a threshold matrix information acquisition unit that obtains information representing the first threshold matrix;
a determining unit that divides the first print image information obtained by the image information acquisition unit into a plurality of portions, and determines whether each of the divided portions includes contour information, based on the first threshold matrix obtained by the threshold matrix information acquisition unit;
a generating unit that generates second print image information by performing a re-binarizing operation for each of the divided portions of the first print image information with the use of a second threshold matrix that is different from the first threshold matrix, based on a determination result of the determining unit; and
an image forming unit that forms an image based on the second print image information generated by the generating unit.

12. The printer device of claim 11, wherein the second threshold matrix is set in accordance with the characteristics of the image forming unit.

13. A non-transitory computer readable medium storing a program causing a computer to execute a process for image processing, the process comprising:
obtaining first print image information that is binarized with the use of a first threshold matrix;
obtaining information that represents the first threshold matrix;
dividing the first print image information into a plurality of divided portions, and determining whether each of the divided portions include contour information, based on the first threshold matrix; and
generating second print image information by performing a re-binarizing operation for each of the divided portions of the first print image information with the use of a second threshold matrix that is different from the first threshold matrix, based on a determination result.

* * * * *